April 9, 1957  L. W. WIGHTMAN  2,787,960
SUMP PUMP
Filed July 24, 1953
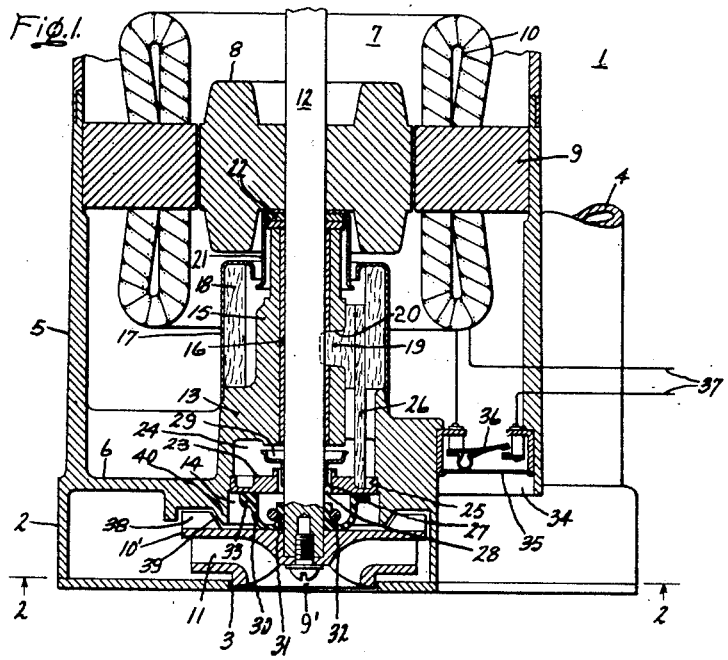
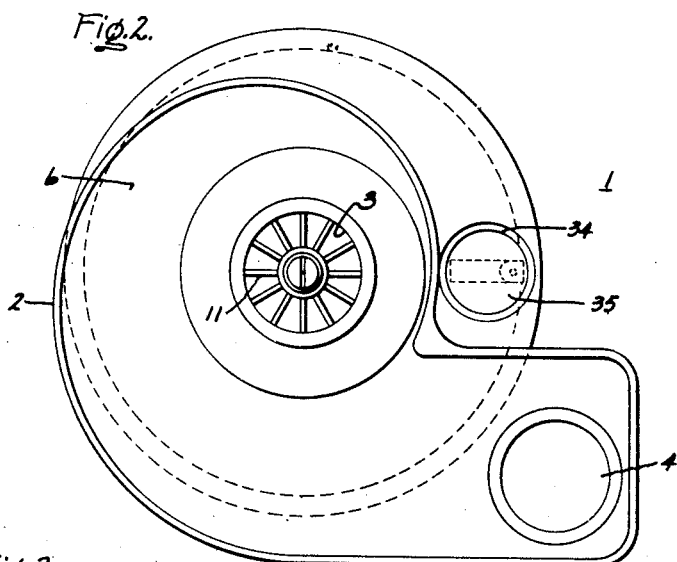
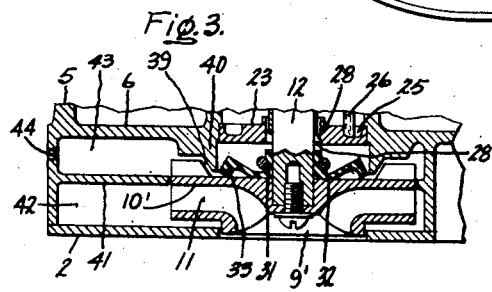
Inventor:
Lawrance W. Wightman,
by Robert G. Irish
His Attorney.

United States Patent Office 2,787,960
Patented Apr. 9, 1957

2,787,960
SUMP PUMP

Lawrance W. Wightman, Fort Wayne, Ind., assignor to General Electric Company, a corporation of New York Application July 24, 1953, Serial No. 370,085

10 Claims. (Cl. 103—25)

This invention relates to sump pumps and more particularly to a sump pump in which the driving motor is arranged in the same overall casing as the pump.

It is frequently desirable to pump liquid out of a depression or liquid collecting cavity, commonly referred to as a sump. In the past, sump pump-motor combinations have been constructed with the motor arranged at some distance above the pump and connected thereto by a long driving shaft. This construction has added appreciably to the cost and it is therefore desirable to provide a sump pump-motor assembly in which the motor is arranged in the same overall casing with the pump and thus is at times submerged. This arrangement requires that a simple and inexpensive means be provided for preventing the entrance of liquid into the interior of the motor.

In addition, sump pump-motor combinations have been actuated in the past by conventional float valve devices. This arrangement has also added appreciably to the cost and has frequently involved considerable maintenance, and it is therefore further desirable to provide a simple and inexpensive liquid level responsive means for actuating a submerged sump pump-motor.

It is therefore an object of this invention to provide an improved sump pump incorporating the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of the specification.

In accordance with this invention, a sump pump is provided having an impeller casing with inlet and outlet openings, and a motor casing adjacent the impeller casing and adapted to have a motor mounted therein. An impeller is arranged in the impeller casing and is mounted on a shaft adapted to be driven by the motor. A passage connects the motor and impeller casing and sealing means mounted on the shaft are arranged normally to close the passage when the shaft is stationary thereby to prevent the entrance of liquid into the interior of the motor casing. The motor casing has an opening formed therein and communicating with the exterior thereof and a liquid level responsive means, such as a diaphragm, is arranged in this opening. Switch means are provided arranged to be actuated by the liquid level responsive means and adapted to be connected in circuit with the motor whereby the motor is energized responsive to the liquid in the sump on the exterior of the assembly reaching a predetermined level. The seal on the impeller shaft is arranged to open the passage when the shaft reaches a predetermined speed and the impeller is provided with means for exhausting the interior of the motor casing through the passage thereby creating a holding force on the liquid level responsive means so that the switch is held in its actuated position while the impeller is pumping liquid. When the liquid level in the sump falls sufficiently so that the impeller begins to pump air, the exhausting means on the impeller also pumps air back into the motor casing thereby relieving the holding force on the liquid level responsive means so that the switch opens to deenergize the motor.

In the drawing,

Fig. 1 is a side elevational view, partly in section, illustrating the improved sump pump construction of this invention;

Fig. 2 is a bottom view of the improved sump pump of Fig. 1 as viewed along the line 2—2; and Fig. 3 is a fragmentary side elevational view, partly in section, illustrating a modified form of this invention.

Referring now to Figs. 1 and 2, there is shown a sump pump-motor combination generally identified as 1 having a lower scroll-type impeller casing 2 having an inlet opening 3 and an exhaust opening 4. A motor casing 5 is disposed over and immediately adjoining the impeller casing 2 with a wall 6 separating the two casings. The motor casing 5 is adapted to have a suitable driving motor 7 arranged therein, such as a single phase induction motor having a squirrel cage rotor 8 and a stator member 9 with suitable field windings 10 arranged therein.

An impeller 9' is arranged within the impeller casing 2 and is formed with a back plate 10' with liquid pumping blades 11 formed on the side thereof adjacent inlet opening 3. Impeller 9' is mounted on shaft 12 which extends into the motor casing 5 and on which rotor 8 is mounted.

Dividing wall 6 has a hub portion 13 formed thereon extending into motor casing 5 and defining a seal cavity 14 communicating with impeller casing 2. Hub portion 13 has a bearing support portion 15 formed thereon in which sleeve bearing 16 is arranged rotatably to guide shaft 12. A cup-shaped lubricant reservoir member 17 is mounted on hub portion 13 and has suitable lubricant absorbing material 18 positioned therein. A portion 19 of the lubricant absorbing material extends through openings 20 in bearing support 15 and bearing 16 to contact the journal surface of shaft 12. A cup-shaped lubricant slinger 21 is mounted on shaft 12 adjacent rotor 8 and extends into the cavity defined by lubricant reservoir 17. Suitable thrust washers 22 are arranged between lubricant slinger 21 and the shoulder of bearing support 15 to provide a thrust bearing.

An annular closure member 23 is arranged in seal cavity 14 and thus defines another cavity 24 with hub portion 13. Closure member 23 has an annular groove 25 formed therein in cavity 24 and in which an extension portion 26 of the lubricant absorbent material is arranged. Closure member 23 has an opening 27 formed therein through which shaft 12 extends with a clearance 28 being provided between shaft 12 and the opening 27. A lubricant slinger 29 is arranged on shaft 12 in cavity 24 and serves to return lubricant which flows along the shaft 12 out of the bearing to the lubricant absorbent material.

In order to seal the clearance 28 so that liquid in the sump cannot enter the interior of motor casing 5 when the motor 7 is not running, a sealing member 30 is provided formed of suitable resilient material, such as rubber or neoprene. Sealing member 30 has a reentrant hub portion 31 secured to shaft 12 in seal cavity 14 in any suitable manner, as by ring 32. Seal member 30 is generally cup-shaped in configuration and has an enlarged rim portion 33 normally engaging closure member 23 around clearance 28 when shaft 12 is not rotating. It will be readily seen that when the shaft 12 reaches a predetermined speed, rim 33 of sealing member 30 will fly away from this engagement with closure member 23 under the influence of centrifugal force and will assume the position shown in Fig. 3.

In order to provide for energizing and deenergizing the motor 7 in response to the liquid level in the sump on the exterior of the assembly, an opening 34 is formed in the motor casing 5 communicating with the exterior thereof and a flexible diaphragm 35 is arranged therein completely filling same. A suitable switch 36 is positioned in the motor casing 5 and is arranged to be actuated by diaphragm 35. Switch 36 is adapted to be connected in series with lines 37 which connect field windings 10 of motor 7 to an external source of single phase alternating current (not shown). It will be readily seen that when the liquid level on the exterior of the sump pump-motor assembly 1 reaches a predetermined level, diaphragm 34 will actuate switch 36 to close the energizing circuit of field windings 10 thus starting the motor 7. In order to complete the assembly, impeller 9′ has air exhausting blades 38 formed on the side of back plate 10′ adjacent seal cavity 14.

In operation, as the liquid level in the sump in which the sump pump-motor combination 1 is arranged, rises, it increases the pressure on diaphragm 35 and at a predetermined liquid level, diaphragm 35 actuates switch 36 to energize motor 7. When the motor has reached a predetermined speed, rim 33 of seal 30 on shaft 12 will fly outwardly under the influence of centrifugal force thus opening clearance 28. Exhausting blades 38 on impeller 9′ then exhaust the interior of motor casing 5 through the clearance 28 thereby creating a holding force on diaphragm 35 so that the switch 36 is held in actuated position even though the liquid level subsequently falls. Thus, when the liquid level in the sump falls by virtue of the operation of the pump, the switch 36 will stay closed due to the holding force on the diaphragm 35 created by exhausting the motor casing 5. When the liquid level in the sump has fallen so far that the pumping blades 11 of impeller 9′ begin to pump air, the exhausting blades 38 will also begin to pump air relieving the holding force on diaphragm 35 permitting switch 36 to open the circuit of motor field windings 10 thus deenergizing the motor. This effect results from the known fact that, for a given blade type pumping device, the vacuum achieved within the space exhausted by the device depends upon the density of the fluid being pumped. When the motor stops, rim 33 of sealing member 30 will again engage the surface of closure member 23 so that the liquid in the sump cannot enter the interior of motor casing 5.

It will be seen that the seal 30 provides little additional load on the motor 7 since it only rubs the surface of closure member 23 at very low speeds during starting and stopping of the motor 7 before the rim 33 has been thrown clear. After rim 33 of sealing member 30 has moved away from the surface of closure member 23, the sealing action is formed by the action of exhausting blades 38 in exhausting motor cavity 5 through clearance 28 around shaft 12 and through resistance path 39 between blades 38 and hub portion 40 of wall 6. It will be seen that the pressure created by the exhausting blades 38 is very high and much more than that required to keep the seal cavity 14 and interior of motor casing 5 dry against the highest reasonable pump pressure created by the pumping blades 11.

In the event that the sump pump-motor assembly is required to operate with an extremely high lift, it may be desirable to provide an arrangement in which the exhausting blades 38 do not have to exhaust against the lift head. Referring now to Fig. 3 in which elements are indicated by like reference numerals, it is seen that a horizontal baffle member 41 is provided in the impeller cavity 2 in alignment with back plate 10′ of impeller 9′ thus defining a pumping cavity 42 and an exhausting cavity 43. An opening 44 is provided in the wall of the impeller casing 2 connecting exhausting cavity 43 to the exterior thereof. Thus, exhausting blades 38 merely exhaust to the pressure of the liquid in the sump rather than against the pressure created by the pumping blades 11.

It will now be readily apparent that this invention provides an improved sump pump wherein the driving motor can be enclosed in the same overall casing with the pump, and also providing an improved liquid level responsive device eliminating the frequent maintenance required with conventional float valve arrangements.

While I have illustrated and described particular embodiments of this invention, further modifications and improvements will occur to those skilled in the art. I desire it to be understood therefore that this invention is not limited to the form shown and I intend in the appended claims to cover all modifications which do not depart from the spirit and scope of this invention.

What I claim as new and desire to secure by Letters Patent of the United States is:

1. A sump pump comprising an impeller casing having inlet and exhaust openings, a motor casing, a motor mounted in said motor casing, a rotatable shaft extending into said impeller casing, an impeller arranged in said impeller casing and mounted on said shaft, said shaft being connected to said motor to be driven thereby, said motor and impeller casings having a passage formed therein connecting them, said motor casing having an opening formed therein communicating with the exterior thereof, pressure sensitive liquid level responsive means positioned in said motor casing opening, switch means operatively connected to said liquid level responsive means and connected in circuit with said motor whereby said motor is energized when said liquid reaches a predetermined level, and speed responsive sealing means on said shaft arranged to seal said passage when said shaft is stationary and to open the same when said shaft reaches a predetermined speed, said impeller having exhausting means adjacent said passage arranged to exhaust said motor casing through said passage when said sealing means opens the same and said impeller is pumping liquid thereby creating a holding force on said liquid level responsive means, said impeller exhausting means pumping air when said impeller is pumping air whereby said holding force on said liquid level responsive means is relieved.

2. A sump pump comprising an impeller casing having inlet and exhaust openings, a motor casing, a motor mounted in said motor casing, a rotatable shaft extending into said impeller casing, an impeller arranged in said impeller casing and mounted on said shaft, said shaft being connected to said motor to be driven thereby, said motor and impeller casings having a passage formed therein connecting them, said motor casing having an opening formed therein communicating with the exterior thereof, pressure sensitive liquid level responsive means positioned in said motor casing opening, switch means in said motor casing operatively connected to said liquid level responsive means and connected in circuit with said motor whereby said motor is energized when said liquid reaches a predetermined level, and speed responsive sealing means on said shaft in said impeller casing arranged to seal said passage when said shaft is stationary and to open the same when said shaft reaches a predetermined speed, said impeller means having exhausting means adjacent said passage arranged to exhaust said motor casing through said passage when said sealing means opens the same and said impeller is pumping liquid thereby creating a holding force on said liquid level responsive means, said impeller exhausting means pumping air when said impeller is pumping air whereby said holding force on said liquid level responsive means is relieved.

3. A sump pump comprising an impeller casing having inlet and exhaust openings, a motor casing, a motor mounted in said motor casing, a rotatable shaft extending into said impeller casing, an impeller arranged in said impeller casing and mounted on said shaft, said shaft being connected to said motor to be driven thereby, said motor and impeller casings having a passage formed therein connecting them, said motor casing having an opening formed therein communicating with the exterior thereof, a pressure sensitive liquid level responsive diaphragm mounted in said motor casing opening, switch means in said motor casing operatively connected to said diaphragm and connected in circuit with said motor whereby said motor is energized when said liquid reaches a predetermined level, and speed responsive sealing means on said shaft in said impeller casing arranged to seal said passage when said shaft is stationary and to open the same when said shaft reaches a predetermined speed, said impeller having exhausting means adjacent said passage arranged to exhaust said motor casing through said passage when said sealing means opens the same and said impeller is pumping liquid thereby creating a holding force on said diaphragm, said impeller exhausting means pumping air when said impeller is pumping air thereby relieving said holding force on said diaphragm.

4. A sump pump comprising an impeller casing having inlet and exhaust openings, a motor casing, a motor mounted in said motor casing, a rotatable shaft extending into said impeller casing, a wall separating said casings and having a shaft opening formed therein, an impeller arranged in said impeller casing and mounted on said shaft, said shaft extending through said wall opening and having a clearance therewith and being connected to said motor to be driven by said motor, said motor casing having an opening formed therein communicating with the exterior thereof, pressure sensitive liquid level responsive means positioned in said motor casing opening, switch means operatively connected to said liquid level responsive means and connected in circuit with said motor whereby said motor is energized when said liquid reaches a predetermined level, and speed responsive sealing means on said shaft arranged to seal said wall opening clearance when said shaft is stationary and to open the same when said shaft reaches a predetermined speed, said impeller having exhausting means adjacent said wall opening arranged to exhaust said motor casing through said clearance when said sealing means opens the same and said impeller is pumping liquid thereby creating a holding force on said liquid level responsive means, said impeller exhausting means pumping air when said impeller is pumping air thereby relieving said holding force on said liquid level responsive means.

5. A sump pump comprising an impeller casing having inlet and exhaust openings, a motor casing, a motor mounted in said motor casing, a rotatable shaft extending into said impeller casing, a wall separating said casings and having a shaft opening formed therein, an impeller arranged in said impeller casing and mounted on said shaft, said shaft extending through said wall opening and having a clearance therewith and being connected to said motor to be driven by said motor, said motor casing having an opening formed therein communicating with the exterior thereof, pressure sensitive liquid level responsive means positioned in said motor casing opening, switch means operatively connected to said liquid level responsive means and connected in circuit with said motor whereby said motor is energized when said liquid reaches a predetermined level, and an annular sealing member formed of flexible material having a hub portion secured to said shaft in said impeller casing and having a rim portion engaging said wall around said wall opening when said shaft is stationary thereby forming a seal for said wall opening clearance, said sealing member rim portion being adapted to move away from said wall under the influence of centrifugal force when said shaft reaches a predetermined speed thereby opening said clearance, said impeller having exhausting means adjacent said wall opening arranged to exhaust said motor casing through said clearance when said sealing member opens the same and said impeller is pumping liquid thereby creating a holding force on said liquid responsive means, said impeller exhausting means pumping air when said impeller is pumping air thereby relieving said holding force on said liquid level responsive means.

6. A sump pump comprising an impeller casing having inlet and exhaust openings, a motor casing, a motor mounted in said motor casing, a rotatable shaft extending into said impeller casing, an impeller arranged in said impeller casing and mounted on said shaft, said shaft being connected to said motor to be driven thereby, said motor and impeller casings having a passage formed therein connecting them, said motor casing having an opening formed therein communicating with the exterior thereof, pressure sensitive liquid level responsive means positioned in said motor casing opening, switch means operatively connected to said liquid level responsive means and connected in circuit with said motor whereby said motor is energized when said liquid reaches a predetermined level, and speed responsive sealing means on said shaft arranged to seal said passage when said shaft is stationary and to open the same when said shaft reaches a predetermined speed, said impeller having a back plate portion with liquid pumping blades formed on the side thereof remote from said motor casing, said impeller having air exhausting blades formed on the side of back plate portion adjacent said motor casing, said exhausting blades being adapted to exhaust said motor casing through said passage when said sealing means opens the same and said impeller is pumping liquid thereby creating a holding force on said liquid level responsive means, said impeller exhausting blades pumping air when said impeller liquid pumping blades are pumping air thereby relieving said holding force on said liquid level responsive means.

7. A sump pump comprising an impeller casing having inlet and exhaust openings, a motor casing, a motor mounted in said motor casing, a rotatable shaft extending into said impeller casing, an impeller arranged in said impeller casing and mounted on said shaft, said shaft being connected to said motor to be driven thereby, said motor and impeller casings having a passage formed therein connecting them, said motor casing having an opening formed therein communicating with the exterior thereof, a pressure sensitive liquid level responsive diaphragm mounted in said motor casing opening, switch means in said motor casing operatively connected to said diaphragm and connected in circuit with said motor whereby said motor is energized when said liquid reaches a predetermined level, and speed responsive sealing means on said shaft arranged to seal said passage when said shaft is stationary and to open the same when said shaft reaches a predetermined speed, said impeller having a back plate portion with liquid pumping blades formed on the side thereof remote from said motor casing, said impeller having air exhausting blades formed on the side of said back plate portion adjacent said motor casing, said air exhausting blades being adapted to exhaust said motor casing through said passage when said sealing means opens the same and said impeller is pumping liquid thereby creating a holding force on said diaphragm, said exhausting blades pumping air when said liquid pumping blades are pumping air thereby relieving said holding force on said diaphragm.

8. A sump pump comprising an impeller casing having inlet and exhaust openings, a motor casing, a motor mounted in said motor casing, a rotatable shaft extending into said impeller casing, a wall separating said casings and having a shaft opening formed therein, an impeller arranged in said impeller casing and mounted on said shaft, said shaft extending through said wall opening and having a clearance therewith and being connected to said motor to be driven by said motor, said motor casing having an opening formed therein communicating with the exterior thereof, pressure sensitive liquid level responsive means positioned in said motor casing opening, switch means operatively connected to said liquid level responsive means and connected in circuit with said motor whereby said motor is energized when said liquid reaches a predetermined level, and an annular sealing member formed of flexible material having a hub portion secured to said shaft in said impeller casing and having a rim portion engaging said wall around said wall opening when said shaft is stationary thereby forming a seal for said clearance, said sealing member rim portion being arranged to move away from said wall under the influence of centrifugal force when said shaft reaches a predetermined speed thereby opening said clearance, said impeller having a back plate portion with liquid pumping blades formed on the side thereof remote from said wall, said impeller having air exhausting blades formed on the side of said back plate portion adjacent said wall, said exhausting blades being adapted to exhaust said motor casing through said clearance when said sealing member opens the same and said impeller is pumping liquid thereby creating a holding force on said liquid level responsive means, said exhausting blades pumping air when said liquid pumping blades are pumping air thereby relieving said holding force on said liquid level responsive means.

9. A sump pump comprising an impeller casing having inlet and exhaust openings, a motor casing, a motor mounted in said motor casing, a rotatable shaft extending into said impeller casing, a wall separating said casings and having a shaft opening formed therein, an impeller arranged in said impeller casing and mounted on said shaft, said shaft extending through said wall opening and having clearance therewith and being connected to said motor to be driven by said motor, said motor casing having an opening formed therein communicating with the exterior thereof, a liquid level responsive diaphragm mounted in said motor casing opening, switch means in said motor casing operatively connected to said diaphragm and connected in circuit with said motor whereby said motor is energized when said liquid reaches a predetermined level, and an annular sealing member formed of flexible material having a hub portion secured to said shaft in said impeller casing and having a rim portion engaging said wall around said wall opening when said shaft is stationary thereby forming a seal for said clearance, said sealing member rim portion being arranged to move away from said wall under the influence of centrifugal force when said shaft reaches a predetermined speed thereby opening said clearance, said impeller having a back plate portion with liquid pumping blades formed on the side thereof remote from said wall, said impeller having air exhausting blades formed on the side of said back plate portion adjacent said wall, said exhausting blades being adapted to exhaust said motor casing through said clearance when said sealing member opens the same and said impeller is pumping liquid thereby creating a holding force on said diaphragm, said exhausting blades pumping air when said liquid pumping blades are pumping air thereby relieving said holding force on said diaphragm.

10. A sump pump comprising an impeller casing having inlet and exhaust openings, a motor casing, a motor mounted in said motor casing, a rotatable shaft extending into said impeller casing, an impeller arranged in said impeller casing and mounted on said shaft, said shaft being connected to said motor to be driven thereby, said motor and said impeller casings having a passage formed therein connecting them, said motor casing having an opening formed therein communicating with the exterior thereof, pressure sensitive liquid level responsive means positioned in said motor casing opening, switch means operatively connected to said liquid level responsive means and connected in circuit with said motor whereby said motor is energized when said liquid reaches a predetermined level, speed responsive sealing means on said shaft arranged to seal said passage when said shaft is stationary and to open the same when said shaft reaches a predetermined speed, said impeller having a back plate portion with liquid pumping blades formed on the side thereof remote from said motor casing, said impeller having air exhausting blades formed on the side of said back plate portion adjacent said motor casing, said exhausting blades being adapted to exhaust said motor casing through said passage when said sealing means opens the same and said impeller is pumping liquid thereby creating a holding force on said liquid level responsive means, and a baffle member in said impeller casing in substantial alignment with said impeller back plate portion and defining a liquid pumping cavity and an air exhausting cavity, said impeller cavity having an opening formed therein communicating with the exterior thereof and said air exhausting cavity, said exhausting blades pumping air when said liquid pumping blades are pumping air thereby relieving said holding force on said liquid level responsive means.

References Cited in the file of this patent

UNITED STATES PATENTS

| 2,488,506 | Bernhardt | Nov. 15, 1949 |
| 2,599,307 | Woodson | June 3, 1952 |
| 2,622,537 | Wartendyke | Dec. 23, 1952 |
| 2,625,107 | Schaefer | Jan. 13, 1953 |

FOREIGN PATENTS

| 133,802 | Great Britain | Oct. 23, 1919 |